Dec. 2, 1952  E. G. STERLAND  2,619,796
GAS TURBINE PLANT HAVING A DYNAMIC COMPRESSOR FOR NORMAL AND
HIGH LOAD OPERATION AND A POSITIVE DISPLACEMENT
COMPRESSOR FOR LOW LOAD OPERATION
Filed Dec. 3, 1946  2 SHEETS—SHEET 1

Dec. 2, 1952          E. G. STERLAND          2,619,796
GAS TURBINE PLANT HAVING A DYNAMIC COMPRESSOR FOR NORMAL AND
HIGH LOAD OPERATION AND A POSITIVE DISPLACEMENT
COMPRESSOR FOR LOW LOAD OPERATION

Filed Dec. 3, 1946          2 SHEETS—SHEET 2

Patented Dec. 2, 1952

2,619,796

UNITED STATES PATENT OFFICE 2,619,796

GAS TURBINE PLANT HAVING A DYNAMIC COMPRESSOR FOR NORMAL AND HIGH LOAD OPERATION AND A POSITIVE DISPLACEMENT COMPRESSOR FOR LOW LOAD OPERATION

Ernest George Sterland, Rugby, England, assignor to The English Electric Company Limited, London, England, a British company Application December 3, 1946, Serial No. 713,679
In Great Britain December 13, 1945

5 Claims. (Cl. 60—39.15)

This invention relates to gas turbine plant. It is particularly applicable to plant wherein the normal demand for power is considerably less than the maximum demand and wherein high efficiency is desired under the condition of normal (rated) operation rather than, or as well as, under the condition of maximum power operation.

Some non-positive displacement types of compressor such as centrifugal and axial flow compressors are liable to surge if they are prevented from delivering a certain minimum mass flow, the value of which is largely dependent upon speed. Such compressors will be referred to in what follows as dynamic compressors. In contradistinction, compressors of the positive displacement type do not surge. However, the positive displacement type is not suitable for delivering such large quantities of air as the axial flow or centrifugal types of comparable speeds of revolution.

A gas turbine plant according to the invention comprises a turbine, having a combustion chamber at its inlet, for the generation of useful power (referred to in what follows as the "power turbine") and also for driving a positive displacement compressor for the supply of compressed air to its own combustion chamber, and an auxiliary turbine, having a combustion chamber at its inlet, arranged to drive a dynamic compressor for the supply of compressed air to its own combustion chamber and also to the combustion chamber of the power turbine.

Figure 1:
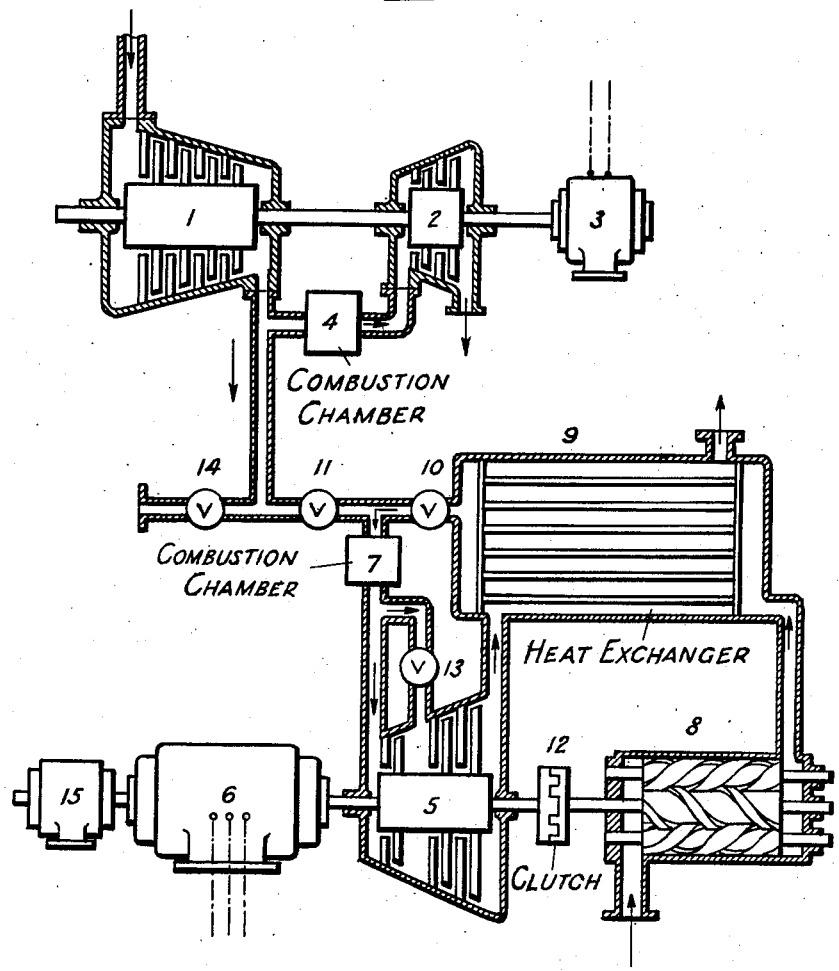
Figure 3:
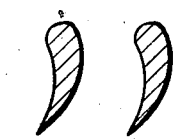
Figure 2:
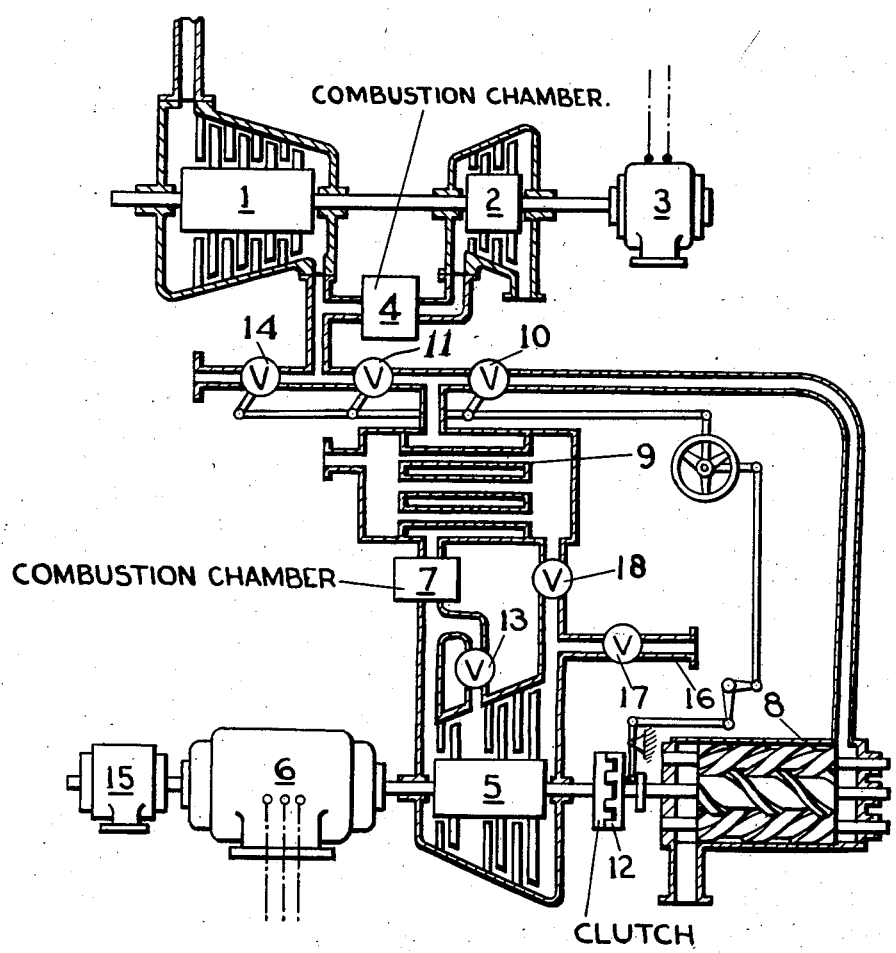

In the accompanying drawing, Fig. 1 shows diagrammatically the arrangement of a gas turbine plant which embodies the invention in preferred form. Fig. 2 shows a modification of the plant according to Fig. 1. Fig. 3 shows a detail on a larger scale.

Referring first to Fig. 1, the useful load for this plant is shown as an electric generator 6 which may be the generator of an electric ship propulsion system.

A power turbine 5 is permanently coupled to the load 6 and to a starting motor 15. For normal operation it is also coupled to a positive displacement compressor 8 by means of a clutch 12. The compressed air delivered by compressor 8 is passed through a heat-exchanger 9 and a valve 10 to a combustion chamber 7. For operation at or below rated power, valves 11 and 14 will be closed. The output from combustion chamber 7 is applied to the input end of the power turbine 5, a by-pass valve 13 being also closed. The exhaust gases from the power turbine 5 are passed through heat-exchanger 9 so that a portion of their heat is transferred to the air delivered by compressor 8.

An auxiliary turbine 2 is permanently coupled to a compressor 1, which may be of the axial flow or centrifugal type, and is also coupled to a starting motor 3. Under conditions of operation of the power turbine 5 at the rated power output or below, this second set comprising the auxiliary turbine 2 is not usefully employed and may be shut down or permitted to idle as may be convenient. When operation is required at a higher than the rated power output, however, this second set is brought into operation, valve 11 is opened and valve 10 is closed, and clutch 12 is disengaged.

When the second set is in operation, its compressor 1 delivers compressed air to combustion chamber 4, and the gases delivered by this combustion chamber pass through the auxiliary turbine 2 which drives the compressor 1. The output of compressed air of the latter is considerably more than sufficient for this purpose and the surplus passes through valve 11 into combustion chamber 7 and is employed in the power turbine 5. Under these conditions, therefore, the turbines 2 and 5 are operating as a parallel flow system each with its own combustion chamber at its inlet. The whole of the power developed by turbine 5 is then usefully employed on the load 6.

The heat exchanger 9 is designed for the air supply from the compressor 8, which is a much less quantity than from compressor 1, and for supply with exhaust gases from the power turbine 5 at the rated power output (at cruising speed).

As shown in Fig. 2, an exhaust pipe 16 leading directly to atmosphere and containing a blow-off valve 17 may be branched off between the outlet of the turbine 5 and the inlet to the heat exchanger 9. This detail arrangement is also applicable to the general arrangement of Fig. 1.

Under full power conditions when high thermal efficiency is not important, as, for example, in the case of a marine propulsion plant for naval purposes, the air supply from the compressor 1, is passed through the valve 11 and the combustion chamber 7 into the turbine 5, while the positive displacement compressor 8 is shut down, valve 11 being fully open and valve 10 fully closed as already described.

The strongly increased quantity of the exhaust gases from the turbine 5 are passed out directly through the branch 16 by opening the blow-off valve 17 in order to avoid overheating of the heat exchanger 9, the cold pass of which is not supplied with air under these conditions.

Alternatively, the heat exchanger 9 may be inserted at the input to combustion chamber 7 of the power turbine (Fig. 2) so that all the air for the power turbine 5 passes through it either from the positive displacement compressor 8 through valve 10 or from the dynamic compressor 1 through valve 11, i. e. under every condition of operation. The heat exchanger 9 is then dimensioned for maximum air flow.

During operation at the rated power output or below, the auxiliary turbine 2 and the compressor 1 in both embodiments may be completely shut down or allowed to rotate at idling speed. Valve 11 is closed. When it is desired to reduce the power output further it is simply necessary to reduce the fuel supply to the combustion chamber 7 of the power turbine 5. Compressor 8, being of the positive displacement type, has no tendency to surge under these conditions.

If it is desired that it shall be possible to reduce the power rapidly to low values after maximum power operation valve 11 is used in both embodiments as a throttle on the air supply to the power turbine 5 and a blow off valve 14 may be opened to prevent surging of compressor 1 as valve 11 is closed.

Another method of carrying into effect the control system according to the invention is to provide a single handwheel which operates cams or other devices in such a way that the coupling 12 is disengaged and valve 10 is closed and valve 11 is opened when the output of the power turbine 5 is increased, and that the blow off valve 14 is opened when valve 11 is closed while the auxiliary turbine is still running at low load or idling.

The power turbine 5 will be designed for highest efficiency at rate power operation. The speed under this condition will usually be lower than the speed at maximum power particularly for marine applications, whereas there will be little difference in the available heat drop. If the blading for the power turbine is designed for the optimum ratio of blade speed to gas speed at normal power, this ratio will then be too high for the maximum power condition and so the efficiency will be relatively poor at maximum power.

In order to minimise the reduction of efficiency at maximum power, blading of bull-nosed type (Fig. 3), having a rounded leading edge may be used which will give small variation of efficiency with the ratio of blade speed to gas speed. Alternatively, the power turbine 5 may be provided with a by-pass belt as indicated with control by valve 13 which may be opened for maximum power operation. This will have the effect of permitting a greater quantity of gas to pass through the power turbine 5 and also of reducing the effective number of stages in operation and so improving the ratio of blade speed to gas speed.

What I claim as my invention, and desire to secure by Letters Patent is:

1. A gas turbine plant comprising in combination a power turbine for the generation of useful power, a combustion chamber in supply pipe connection with the said power turbine, a positive displacement type compressor driven by the said power turbine and in direct supply pipe connection to the said combustion chamber, an auxiliary turbine, a combustion chamber in supply pipe connection with the said auxiliary turbine, a dynamic compressor driven by the said auxiliary turbine, and switch-over valve means having one position connecting the said dynamic compressor with the combustion chamber of the said auxiliary turbine alone and another position connecting the said dynamic compressor with the combustion chambers of the said auxiliary turbine and power turbine in parallel.

2. A gas turbine plant comprising in combination a power turbine for the generation of useful power, a combustion chamber in supply pipe connection with the said power turbine, a positive displacement type compressor, clutch means alternatively coupling the said compressor to and disengaging the same from the said power turbine, a direct supply pipe connection from the said compressor to the said combustion chamber, valve means connected in said pipe connection and in an operative connection to the said clutch means in the sense of having an open position when the said compressor is coupled by the said clutch means to the said power turbine and a closed position when the said compressor is disengaged from said power turbine, an auxiliary turbine, a combustion chamber in supply pipe connection with the said auxiliary turbine, a dynamic compressor driven by the said auxiliary turbine, and switch-over valve means having one position connecting said dynamic compressor with the combustion chamber of the said auxiliary turbine alone and another position connecting the said dynamic compressor with the combustion chambers of the said auxiliary turbine and power turbine in parallel.

3. A gas turbine plant comprising in combination a power turbine for the generation of useful power, a combustion chamber in supply pipe connection with the said power turbine, a positive displacement type compressor driven by the said power turbine, a clutch device operatively arranged between the said power turbine and the said compressor, the said compressor being in direct supply pipe connection to the said combustion chamber at low load conditions of the said power turbine, an auxiliary turbine, a combustion chamber in supply pipe connection with the said auxiliary turbine, a dynamic compressor driven by the said auxiliary turbine, supply pipe connections from the said dynamic compressor to the combustion chambers of the said power turbine and auxiliary turbine, and valve means connected in the said pipe connection to the said power turbine, one of the said valve means being a stop valve cutting off the said power turbine at low load conditions from the said dynamic compressor and another one of the said valve means being a blow-off valve passing away at least part of the compressed air from the said dynamic compressor.

4. A gas turbine plant comprising in combination a power turbine having a plurality of stages each comprising rotor blades and stationary guide elements, a combustion chamber, switch-over valve means having one position connecting the said combustion chamber to the guide elements of the first stage of the said power turbine at rotational speeds thereof up to and including its rated speed, and a second position connecting the said combustion chamber to the guide elements of an intermediate stage of the said power turbine at a rotational speed of said power turbine exceeding its rated speed, a positive displacement type compressor driven by the said power turbine and in supply pipe connection to the said combustion chamber, valve means connected into this pipe connection having an open position at rotational speeds of said turbine up to and including its rated speed and a closed position at rotational speeds exceeding said rated speed, an auxiliary turbine, a combustion chamber in supply pipe connection with the said auxiliary turbine, a dynamic compressor driven by the said auxiliary turbine and switch-over valve means having one position connecting the said dynamic compressor with the combustion chamber of the said auxiliary turbine only and a second position connecting the said dynamic compressor with the combustion chambers of the said auxiliary turbine and power turbine in parallel.

5. A gas turbine plant comprising in combination a power turbine for the generation of useful power, a combustion chamber in supply pipe connection with the said power turbine, a positive displacement type compressor driven by the said power turbine and in direct supply pipe connection to the said combustion chamber, a heat exchanger having a hot pass connected to the exhaust side of the said power turbine and a cold pass connected between the delivery side of the said positive displacement compressor and the said combustion chamber, a by-pass valve arranged between the exhaust side of the said power turbine and the said heat exchanger passing away at least part of the exhaust gases directly from the said power turbine at high load conditions, an auxiliary turbine, a combustion chamber in supply pipe connection with the said auxiliary turbine, a dynamic compressor driven by the said auxiliary turbine and switch-over valve means having one position connecting the said dynamic compressor with the combustion chamber of the said auxiliary turbine alone and another position connecting the said dynamic compressor with the combustion chambers of the said auxiliary turbine and power turbine in parallel.

ERNEST GEORGE STERLAND.

REFERENCES CITED

The following references are of record in the file of this patent:

UNITED STATES PATENTS

| Number | Name | Date |
|---|---|---|
| 2,115,112 | Lysholm | Apr. 26, 1938 |
| 2,245,954 | Anxionnaz | June 17, 1941 |
| 2,365,616 | Zweifel | Dec. 19, 1944 |
| 2,418,911 | Smith | Apr. 15, 1947 |
| 2,444,456 | Lysholm | July 6, 1948 |
| 2,467,167 | Traupel | Apr. 12, 1949 |
| 2,554,593 | Sédille | May 29, 1951 |
| 2,580,591 | Pouit | Jan. 1, 1952 |